(12) United States Patent  (10) Patent No.: US 7,942,422 B2
Tierling  (45) Date of Patent: May 17, 2011

(54) MULTIWALL PIPE LIP SEAL JOINT

(75) Inventor: Kenneth Tierling, Conroe, TX (US)

(73) Assignee: Unisert Multiwall Systems, Inc., Conroe, TX (US)

( * ) Notice: Subject to any disclaimer, the term of this patent is extended or adjusted under 35 U.S.C. 154(b) by 0 days.

(21) Appl. No.: 12/319,190

(22) Filed: Jan. 2, 2009

(65) Prior Publication Data
US 2010/0171301 A1  Jul. 8, 2010

(51) Int. Cl.
F16L 9/18 (2006.01)
F16L 17/06 (2006.01)
F16J 15/06 (2006.01)

(52) U.S. Cl. .......... 277/314; 277/614; 285/54; 285/55; 285/336; 285/295.3; 285/123.12; 285/123.15

(58) Field of Classification Search .......... 277/614, 277/314; 285/53–55, 295.1, 295.3, 336, 285/369, 123.12, 123.15, 294.1, 294.4, 288.1
See application file for complete search history.

(56) References Cited

U.S. PATENT DOCUMENTS

| 2,182,995 | A | * | 12/1939 | Pepper et al. | 285/331 |
|---|---|---|---|---|---|
| 2,777,715 | A | * | 1/1957 | Beyer | 285/112 |
| 2,860,311 | A | * | 11/1958 | Balian | 333/248 |
| 3,189,371 | A | * | 6/1965 | Swan | 285/55 |
| 3,594,022 | A | * | 7/1971 | Woodson | 285/336 |
| 3,686,747 | A | * | 8/1972 | Bagnulo | 29/508 |
| 3,836,159 | A | * | 9/1974 | Dryer | 277/612 |
| 3,870,322 | A | * | 3/1975 | Marshall | 277/643 |
| 4,037,626 | A | | 7/1977 | Roberts, Jr. | |
| 4,130,301 | A | * | 12/1978 | Dunham et al. | 285/47 |
| 4,147,381 | A | * | 4/1979 | Schwarz | 285/53 |
| 4,340,245 | A | * | 7/1982 | Stalder | 285/53 |
| 4,400,019 | A | | 8/1983 | Fruck | |
| 4,640,532 | A | | 2/1987 | Pope | |
| 4,643,465 | A | * | 2/1987 | Green et al. | 285/236 |
| 4,836,583 | A | * | 6/1989 | Maier et al. | 285/336 |
| 4,930,791 | A | * | 6/1990 | Ungchusri et al. | 277/607 |
| 5,001,320 | A | | 3/1991 | Conley et al. | |
| 5,088,772 | A | * | 2/1992 | Van Dijck | 285/47 |
| 5,161,835 | A | * | 11/1992 | Miyake | 285/322 |
| 5,163,715 | A | | 11/1992 | Rickard et al. | |
| 5,330,238 | A | * | 7/1994 | Carlstrom | 285/293.1 |
| 5,362,112 | A | * | 11/1994 | Hamilton et al. | 285/110 |
| 5,406,983 | A | * | 4/1995 | Chambers et al. | 138/109 |
| 5,480,196 | A | * | 1/1996 | Adams, Jr. | 285/369 |
| 5,505,497 | A | * | 4/1996 | Shea et al. | 285/55 |
| 5,624,124 | A | * | 4/1997 | Ungchusri et al. | 277/607 |
| 5,709,411 | A | * | 1/1998 | Bank et al. | 285/110 |
| 5,782,500 | A | * | 7/1998 | Mate | 285/24 |

(Continued)

Primary Examiner — Alison K Pickard
(74) Attorney, Agent, or Firm — Mary J. Gaskin

(57) ABSTRACT

An elastomeric lip seal joint for sealing the inner liner and grout layers when joining two sections of multiwall pipe having an outer steel casing and an inner liner. The ring-shaped lip seal joint comprises a gasket with insulating material completely covering its outer surface. The insulating material is capable of shielding the gasket from the heat produced when the sections of outer steel casing are welded together. The use of the lip seal joint simplifies the process of joining sections of multiwall pipe. Each side of the lip seal joint is inserted into one of the annular voids at each end of the pipe, thereby sealing the inner liner and grout. A single circumferential weld then joins the outer steel casing. The gasket remains intact during the welding process due to the presence of the insulating material.

14 Claims, 5 Drawing Sheets

U.S. PATENT DOCUMENTS

| | | | |
|---|---|---|---|
| 5,863,078 A * | 1/1999 | Ball | 285/24 |
| 5,944,319 A * | 8/1999 | Kohlman | 277/314 |
| 6,142,359 A * | 11/2000 | Corbishley et al. | 228/104 |
| 6,142,536 A * | 11/2000 | Wolfsdorf | 285/112 |
| 6,521,072 B1 * | 2/2003 | Campbell | 156/158 |
| 6,979,025 B2 * | 12/2005 | Conder et al. | 285/55 |

* cited by examiner

MULTIWALL PIPE LIP SEAL JOINT

FIELD OF THE INVENTION

The present invention is directed to an improved method and apparatus for joining sections of multiwall pipe.

BACKGROUND OF THE INVENTION

Multiwall pipe is suitable for pipeline applications when single-wall pipe is not acceptable due to environmental, safety and thermal considerations, as well as negative buoyancy. Sections of multiwall pipe are typically joined to form pipeline systems which provide an effective means of containing the material being transported. For example, multiwall pipe is typically used for transporting corrosive or hazardous materials, such as oil, for slurry pipe lines, and for insulated sub-sea lines.

Multiwall pipe typically comprises a steel outer casing and an inner liner pipe. The outer casing provides tensile strength to the pipeline, as well as secondary containment of the material being transported. The inner liner pipe provides a corrosion barrier, as well as radial strength. The annulus between the two casings and the liner may be filled with an incompressible cement grout insulating material in order to provide thermal protection for transporting temperature-sensitive materials, such as crude oil or heavy fuel oil, when other insulating methods are unsuitable.

Presently, sections of multiwall pipe are joined in two steps: first, the inner liner pipe layer is joined, followed by welding together the sections of outer casing. The sections of inner liner pipe, which can be made from materials such as steel, fiberglass, polyethylene, or polyvinyl chloride (PVC), are joined in several ways, including full circumferential welds, interference fit bands, or butt wrap joints. The steel casing is then joined by full circumferential welds. Having to perform these two operations in order to join sections of multiwall pipe is both time-consuming and expensive. Further, using such methods with sections of large-diameter multi-wall pipe has had a low success rate.

The disadvantages of the prior art are overcome by the present invention. Novel methods and apparatus are hereinafter described for efficiently and reliably joining sections of multiwall pipe, even large diameter pipe.

SUMMARY OF THE INVENTION

The present invention is successfully used to join sections of multiwall pipe with a single welding step, thereby reducing joining time, increasing production, and decreasing costs.

A typical section of multiwall pipe is formed in a manufacturing plant, with a metal outer casing, an inner liner pipe (or carrier casing), and an annulus between the casing and pipe filled with grout or other insulating material. Preferably, both ends of each of the outer casing and the inner liner extend a short distance beyond the annular material, leaving an annular void at both ends of each multiwall pipe section. Otherwise, the grout in the annular space at each end of each section of multiwall pipe is removed to facilitate insertion of the lip-seal joint described infra.

The present invention uses an elastomeric lip seal joint to seal the inner liner and grout when joining two sections of multiwall pipe. The lip seal joint is ring-shaped. It uses a joint ring, which is a gasket having an inner diameter which corresponds to the outer diameter of the inner liner. A piece of insulating material completely covers the outer surface of the gasket. The insulating material is capable of shielding the gasket from the heat produced when the sections of steel casing are welded together. Without the insulating material, a traditional rubber gasket would be destroyed during the welding process.

The use of the lip seal joint simplifies the process of joining sections of multiwall pipe. The lip seal joint is aligned between the ends of two sections of multiwall pipe, and its edges are inserted into the annular voids therein, sealing the inner liner and grout. The sections of steel casing are then joined together by single circumferential welds. The gasket remains intact during the welding process due to the presence of the insulating material.

It is an object of the present invention to provide a lip seal joint for joining sections of multiwall pipe that carry pipeline fluids under high pressure in the inner liner.

Another object of the present invention is to provide an insulating material to protect the sealing gasket and the inner liner from the heat produced when sections of the outer casing are welded together.

Yet another object is to provide a method and apparatus for joining sections of multiwall pipe in a time-efficient, cost-effective manner.

Still another object of the present invention is to provide an insulated lip seal joint for use with inner liners that are coated or lined with materials unable to withstand heat produced when the steel casing sections are welded.

These and other features and advantages will become apparent in the following detailed description, wherein reference is made to the figures in the accompanying drawings.

BRIEF DESCRIPTION OF THE DRAWINGS

FIG. 3A is an exploded view of the lip seal joint, showing how the insulating material will be affixed to the outer surface of the gasket.

FIG. 3B shows the assembled lip seal joint, with a portion in cutaway view.

FIG. 4A shows the ends of two sections of multiwall pipe, which are axially aligned prior to being joined together.

FIG. 4B shows the ends of the two sections of multiwall pipe, with a portion of the grout having been removed.

FIG. 4C shows the lip seal joint of the present invention which has been axially arranged between the ends of the two sections of multiwall pipe.

FIG. 4D shows one side of the lip seal joint fitted into the annular void between the outer casing and the inner liner at the end of one of the sections of multiwall pipe. The second side of the lip seal joint will be fitted into the annular void at the end of the other section of multiwall pipe.

FIG. 4E shows the lip joint in place, completely filling the annular voids between the outer casing and the inner liner of the multiwall pipe at each end of the multiple pipe. The outer casing is ready for welding.

DESCRIPTION OF THE PREFERRED EMBODIMENT

Figure 1:
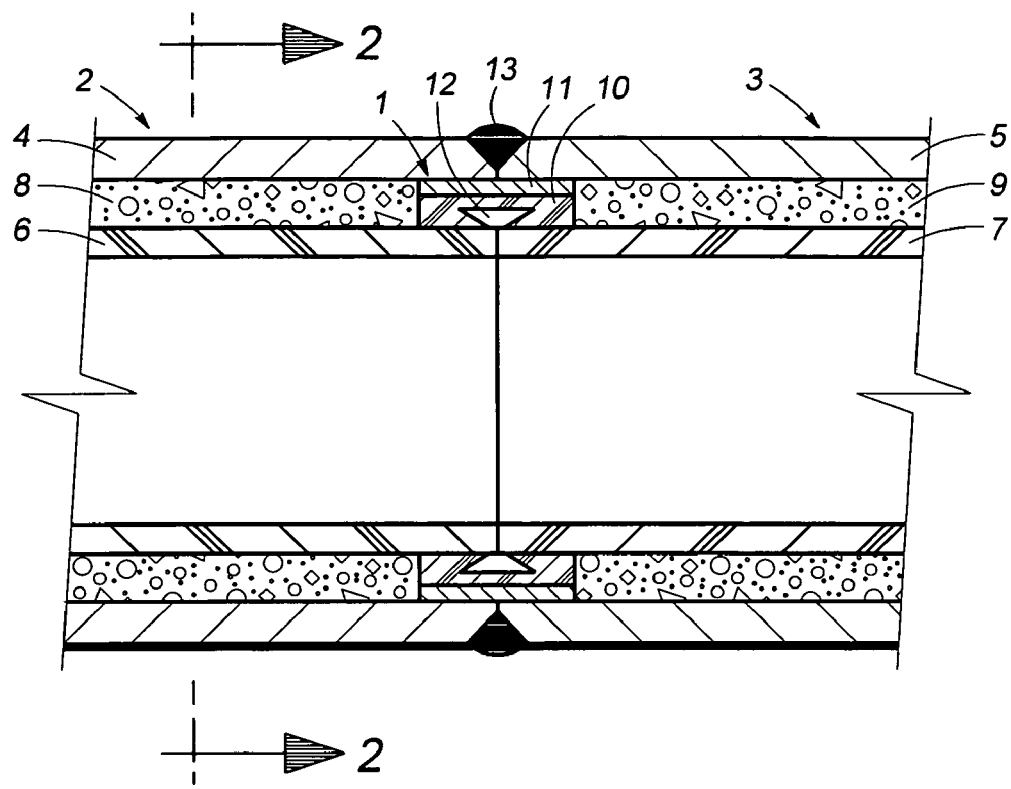
FIG. 1 is a cross-sectional side view of the end portions of abutting sections of multiwall pipe, which have been joined together by the lip seal joint of the present invention and then welded.

The lip seal joint I is shown in FIG. 1, after its installation between two multiwall pipe sections 2, 3. Each pipe section 2, 3 has been fabricated with an outer steel casing 4, 5 and an inner liner 6, 7, with a grout layer 8, 9 in between. The lip seal joint 1 comprises an elastomeric gasket 10 with a layer of insulating material 11 covering its outer surface. The gasket 10 is generally ring-shaped, with an open notch 12 cut into its inner surface. The lip seal joint 1 seals the ends of inner liner 6, 7, and the ends of outer steel casing 4, 5 have been joined by a circumferential weld 13.

Figure 2:
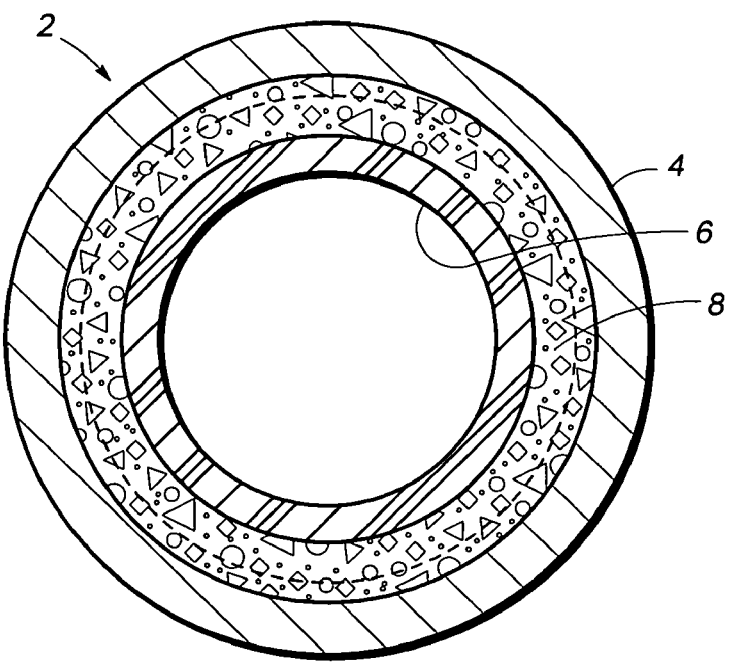
FIG. 2 is a cross-sectional view of a section of the multiwall pipe shown in FIG. 1, taken along line 2-2 in FIG. 1.

FIG. 2 shows the roundness of each multiwall pipe section 2, with a grout layer 8 filling the annulus between the outer steel casing 4 and the inner liner 6.

Figure 3A:
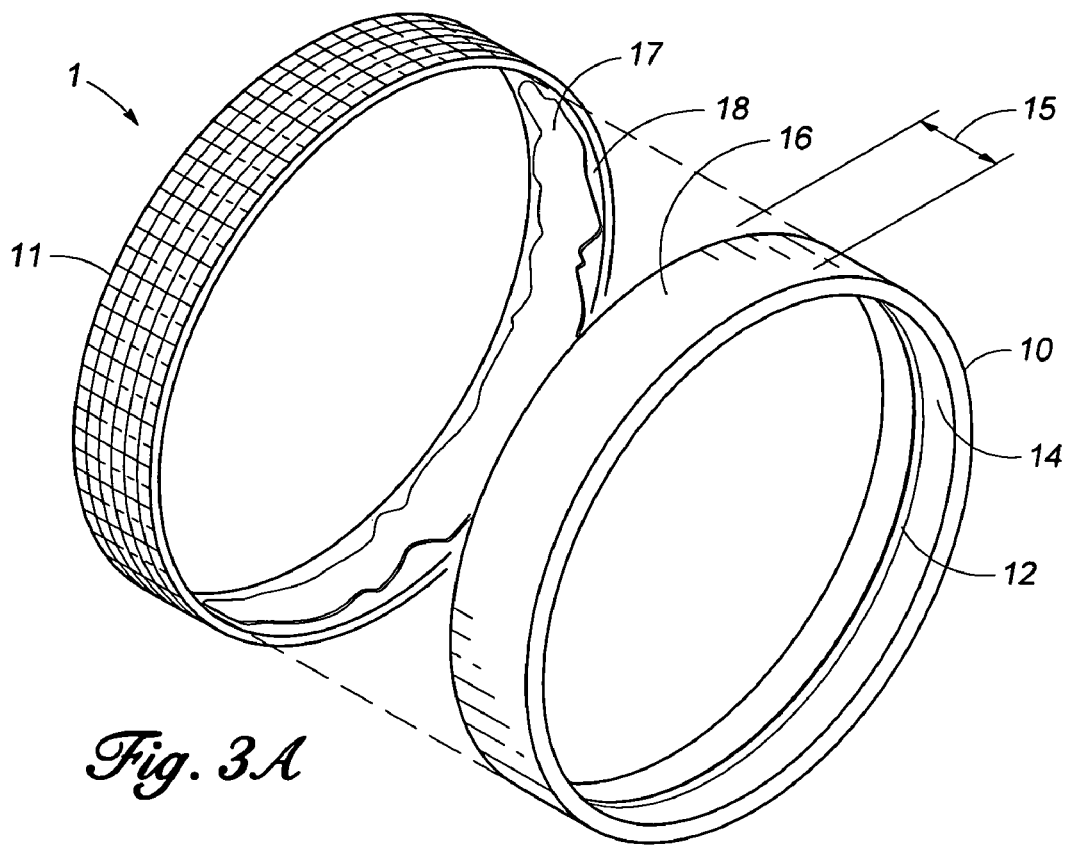
FIGS. 3A and 3B are views of the lip seal joint of the present invention.

The exploded lip seal joint in FIG. 3A shows the gasket 10, the outer surface of which will be covered by a layer of insulating material 11. The ring-shaped gasket 10 can be made from any of a number of elastomeric materials, such as rubber, neoprene, Buna-N, silicone and polyurethane. The gasket 10 typically has a triangular notch 12 cut into its inner surface 14, which allows entry of fluid or gas pressure via the unsealed ends of the inner liner 6, 7. Entry of pressure into the triangular notch 12 area causes the gasket 10 to expand; however, because the gasket 10 is constrained by the grout layers 8, 9 on the sides and by the steel casing 4, 5 in the hoop direction, the lips of the gasket 10 are forced against the inner liner 6, 7, thereby improving the resulting seal. A strip of stiffening material, such as a flat PVC strip, can be mounted inside the triangular notch 12 in order to facilitate installation of the lip seal joint 1; such a strip would prevent the collapse of the lip seal joint 1 as it is inserted over the ends of the inner liner 6, 7 into the annular voids, as shown in FIGS. 4C and 4D, infra. The inner diameter of the gasket 10 corresponds to the outer diameter of the inner liner 6, 7 of the multiwall pipe sections 2, 3 with which the lip seal joint 1 will be used. See FIG. 1. The width 15 of the gasket 10 depends on the multiwall pipe with which it will be used, for example, it can be made in the range from approximately one to four inches. The insulating material 11 can be made of any of a number of materials, including titanium, flexible ceramics, steel products, and coated fiberglass products. The insulating material 11, which can come in the form of a tube or a strip, is cut to the width and length necessary to cover the outer surface 16 of the gasket 10 being used. A bonding agent 17 is applied to either the inner attachment surface 18 of the insulating material 11 or to the outer surface 16 of the gasket 10. The bonding agent 17 can be any of a number of agents, including neoprene bonding agents, nitrite bonding agents, anaerobic activators, and rubberized adhesives. The insulating material 11 must be properly aligned to ensure that it completely covers the outer surface 16 of the gasket 10. The bonding agent 17 must then be allowed to set for several hours to ensure that the bond will not crack, slip, or separate when the lip seal joint 1 is used to join multiwall pipes. Alternatively, the insulating material 11 may be formed or friction-mounted onto the outer surface 16 of the gasket 10.

Figure 3B:
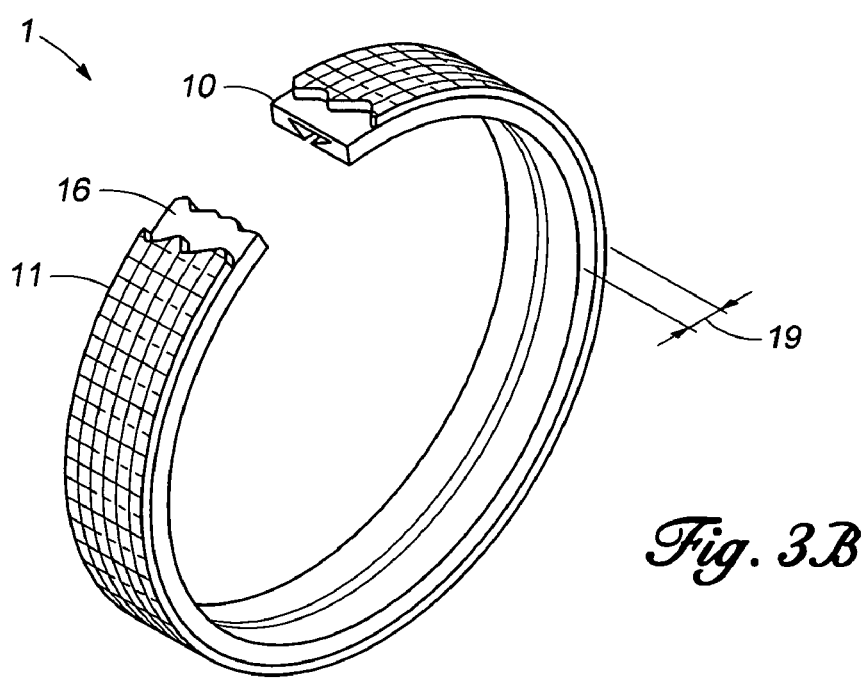

FIG. 3B shows the assembled lip seal joint 1, with a portion cut away to show the layer of insulating material 11 adhering to the outer surface 16 of the gasket 10. The thickness 19 of the lip seal joint 1 depends on the thickness of the grout layers 8, 9 of the multiwall pipe with which it will be used, for example, one to four inches.

FIGS. 4A through 4E show the method of using the lip seal joint 1 of the present invention.

Figure 4A:
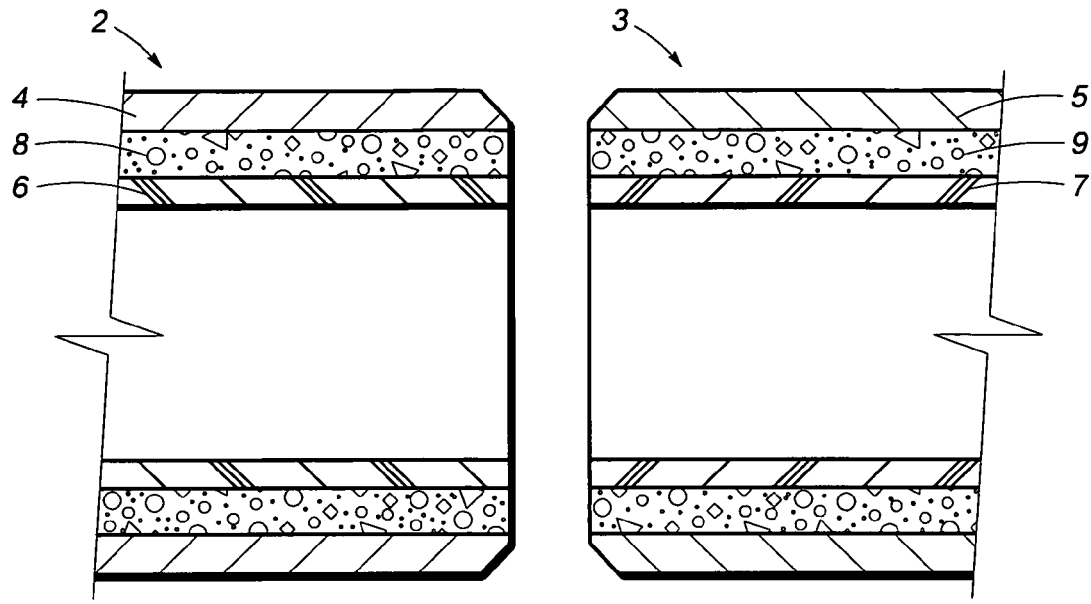
FIGS. 4A through 4E show the steps that are taken when using the present invention.

FIG. 4A shows the ends of two sections 2, 3 of multiwall pipe, which have been axially aligned end-to-end in a spaced-apart relationship. Each section 2 3 has an outer steel casing 4, 5, with beveled edges, an inner liner 6, 7, and a grout layer 8, 9. The grout layers 8, 9 shown fill the annulus between the steel casing 4, 5 and the inner liners 6, 7. However, multiwall pipe can also be fabricated so that the grout layers 8, 9 do not extend to the ends of the pipe sections 2, 3. The grout layers 8, 9 transfer hoop strain to the outer steel casing 4, 5. Additives may be added to the grout layers 8, 9 to improve the grout's thermal insulating ability, and weight material may be added for negative buoyancy in marine applications. Materials other than grout, such as insulating foam or epoxy grout, can be used to fill the annulus, depending on operating requirements.

Figure 4B:
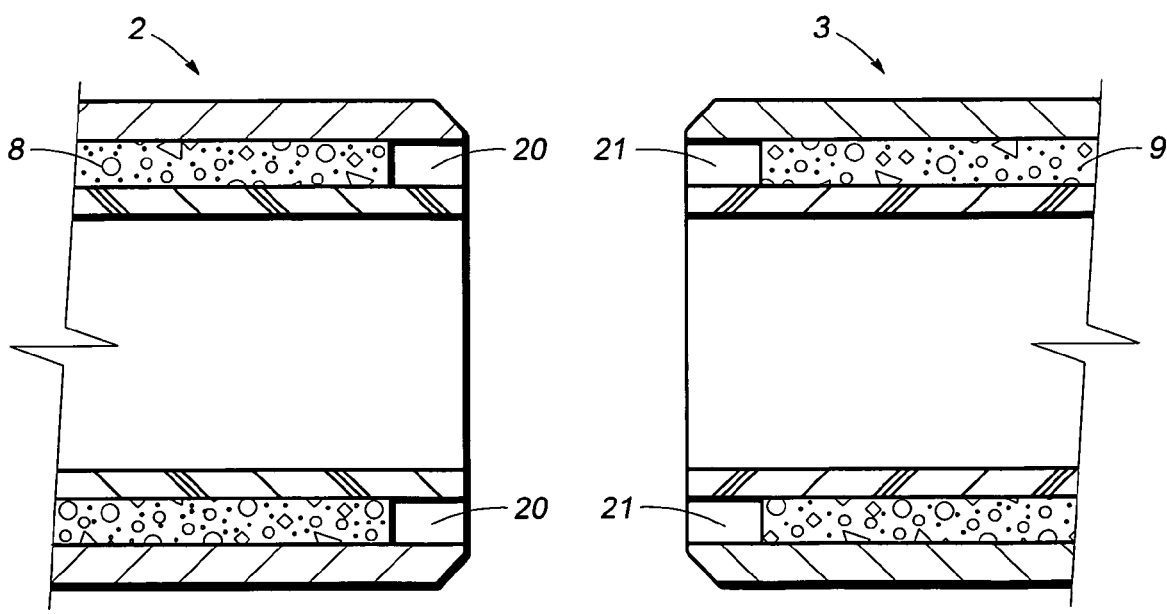
Figure 4C:
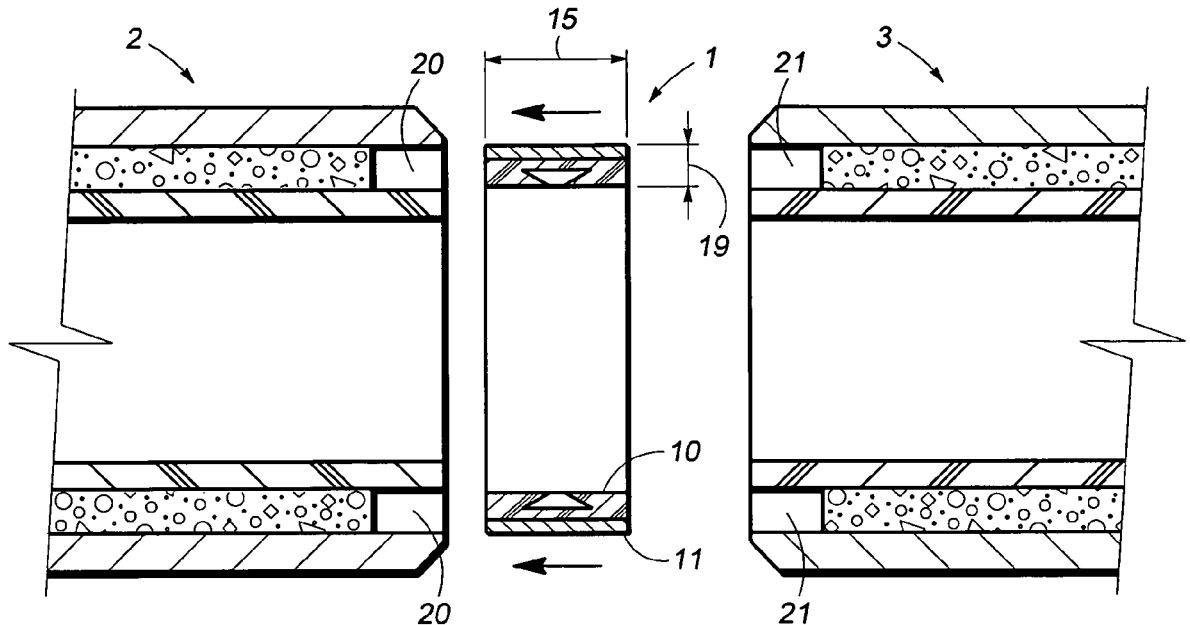
Figure 4D:
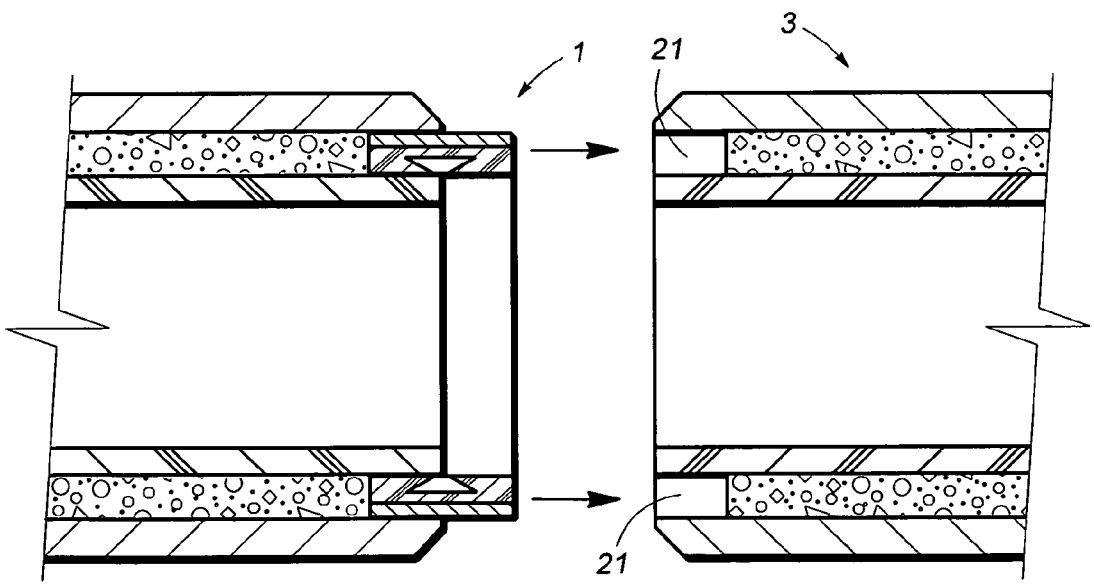

FIG. 4B shows the ends of two sections 2, 3 of multiwall pipe before insertion of a lip seal joint 1. The ends of the grout layers 8, 9 have been ground out to leave annular voids 20, 21 at each of the ends of the multiwall pipe sections 2, 3. Alternatively, the multiwall pipe sections 2, 3 may have been fabricated to leave annular voids 20, 21. In either case, the width of the annular voids 20, 21 are sized to equal one-half of the width 15 of the lip seal joint 1 that will be inserted therein.

In FIG. 4C, the lip seal joint 1 comprising the gasket 10 with insulating material 11, has been positioned between the ends of the two multiwall pipe sections 2 3. The lip seal joint 1 has width 15 and a thickness 19, selected to ensure that the lip seal joint will fill both annular spaces 20, 21 after insertion. One side of the lip seal joint 1 will be inserted into the annular void 20 at the end of the first multiwall pipe section 2.

As shown in FIG. 4D, the other side of the lip seal joint 1 will then be inserted into the annular void 21 at the end of the second multiwall pipe section 3.

Figure 4E:
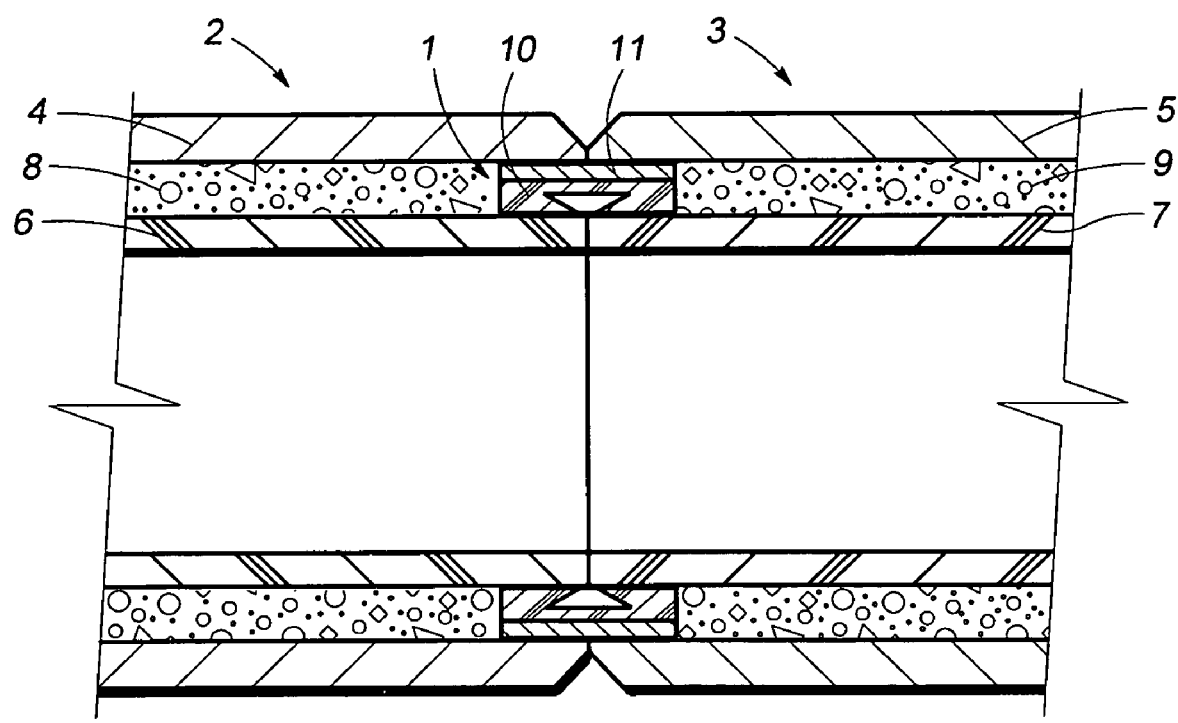

As shown in FIG. 4E, the two multiwall pipe sections 2, 3 are ready for welding of the outer steel casings 4, 5. The lip seal joint 1 fills the annular voids 20, 21 and is completely enclosed by the end of the outer casing 4, 5 and the inner liner 6, 7. The lip seal joint 1 is supported in the hoop direction by the outer steel casing 4, 5 and in the axial direction by the grout layers 8, 9. The compressive strength must be greater than the pressure applied to it, allowing the lip seal joint 1 to form a tight seal when the inner liner 6, 7 is under pressure. Because the sealing surfaces are axially aligned, pressure caused by fluids passing through the inner liner 6, 7 forces the lip seal joint 1 to expand against the outer surface of the inner liner 6, 7, resulting in a tight seal of the lip seal joint 1. Further, the insulating material 11 protects the gasket 10 from the heat resulting from the welding process.

Use of the lip seal joint 1 results in cost savings due to the efficiency of its installation. Its use in installing multiwall pipelines is clearly preferable to the use of presently-available pipe joints, which require welding and wrapping of both the inner liner and the outer steel casing.

I claim:

1. A ring-shaped member for use in joining lengths of multiwall pipe to form pipeline systems for transporting pipeline fluids, each length having two ends, a steel outer casing, an inner liner having a uniform outer diameter, and an annulus holding a grout layer, the annulus having a height between the outer casing and the inner liner and an annular void having a width at each of the ends, the member comprising:

an elastomeric gasket having an outer surface and an inner surface;

insulating material dimensioned to completely cover the outer surface of the gasket; and means for affixing the insulating material to the outer surface of the gasket;

the member having a first side and a second side and a uniform inner diameter corresponding to the uniform outer diameter of the inner liner and further having a height corresponding to the height of the annulus and a width equal to twice the width of the annular void at each of the ends of the lengths of pipe, the member being fabricated so that the first side fits into the annular void at the end of a first length of multiwall pipe and the second side fits into the annular void at the end of a second length of multiwall pipe, thereby sealing the inner liner at the ends of the first length of pipe and the second length of pipe, the member being completely enclosed by abutting ends of the outer casing and the inner liner.

2. The ring-shaped member of claim 1 which further comprises a circumferential, triangular, centrally-located open notch cut into the inner surface of the gasket.

3. The ring-shaped member of claim 2 which further comprises a strip of stiffening material mounted inside the notch.

4. The ring-shaped member of claim 1, wherein the elastomeric material is selected from the group consisting of rubber, neoprene, Buna-N, silicone, and polyurethane.

5. The ring-shaped member of claim 1, wherein the insulating material is fabricated from a material selected from the group consisting of titanium, flexible ceramics, steel, and coated fiberglass.

6. The ring-shaped member of claim 1, wherein the means for affixing the insulating material to the outer surface of the gasket is a bonding agent selected from the group consisting of neoprene bonding agents, nitrite bonding agents, anaerobic activators, and rubberized adhesives.

7. The ring-shaped member of claim 1, wherein the means for affixing the insulating material to the outer surface of the gasket is selected from friction-mounting and formation thereon.

8. A method for joining lengths of multiwall pipe having two ends, a steel outer casing, an inner liner having an outer diameter, and a uniform annulus holding a grout layer, the annulus having a height between the outer casing and the inner liner and an annular void having a width at each of the ends, the method comprising the following steps:
   (a) axially aligning a first length of multiwall pipe and a second length of multiwall pipe, end-to-end in a spaced-apart relationship;
   (b) positioning between the first length of pipe and the second length of pipe a ring-shaped member having a first side and a second side and a uniform inner diameter corresponding to the uniform outer diameter of the inner liner, the member comprising an elastomeric gasket having an outer surface and an inner surface, and further having insulating material affixed to and completely covering the outer surface of the gasket;
   (c) inserting the first side of the member into the annular void at the end of the first length of pipe;
   (d) inserting the second side of the member into the annular void at the end of the second length of pipe;
   (e) ensuring that the ring-shaped member is completely enclosed within the annular voids by the abutting ends of the outer casing and the inner liner;
   (f) welding together the outer casing at the end of the first length of pipe and the second length of pipe; and
   (g) having the member be supported by the outer casing of the pipe.

9. The method of claim member of claim 8 wherein the ring-shaped member further comprises a circumferential, triangular, centrally-located open notch cut into the inner surface of the gasket.

10. The method of claim 9, which further comprises mounting a strip of stiffening material inside the notch of the ring-shaped member.

11. The method of claim 8, wherein the ring-shaped member is fabricated from an elastomeric material selected from the group consisting of rubber, neoprene, Buna-N, silicone, and polyurethane.

12. The method of claim 8, wherein the ring-shaped member has an insulating material fabricated from a material selected from the group consisting of titanium, flexible ceramics, steel, and coated fiberglass.

13. The method of claim 8, wherein the insulating material is affixed to the outer surface of the gasket by a bonding agent selected from the group consisting of neoprene bonding agents, nitrite bonding agents, anaerobic activators, and rubberized adhesives.

14. The method of claim 8, wherein the insulating material is affixed to the outer surface of the gasket by means selected from friction-mounting and formation thereon.

* * * * *